Nov. 3, 1964 R. E. MARRS 3,155,977

RESILIENT RECORDING DISK

Filed Aug. 31, 1959 3 Sheets-Sheet 1

INVENTOR.
RALPH E. MARRS
BY Walter J. Madden Jr.
ATTORNEY

Nov. 3, 1964 R. E. MARRS 3,155,977

RESILIENT RECORDING DISK

Filed Aug. 31, 1959 3 Sheets-Sheet 3

3,155,977

RESILIENT RECORDING DISK

Ralph E. Marrs, Campbell, Calif., assignor to International Business Machines Corporation, New York, N.Y., a corporation of New York Filed Aug. 31, 1959, Ser. No. 837,104
9 Claims. (Cl. 346—74)

This invention relates to magnetic recording apparatus and relates more particularly to magnetic recording apparatus employing a pliable recording surface.

In copending applications Serial Numbers 756,119, now Patent No. 3,036,304, and 796,114, now Patent No. 3,001,850, assigned to the same assignee as the present application, there is disclosed recording apparatus utilizing cylindrical drums of resilient magnetizable material which cooperate with one or more transducers for recording on the resilient surface. The use of such a resilient recording surface has many advantages over a relatively rigid recording surface. In magnetic recording, it is generally desirable to position the transducer as closely as possible to the record surface in order to achieve maximum recording density. The achievement of this close spacing with rigid record surfaces requires very close control of the mechanical tolerances of the components, whereas, a resilient surface is capable of flexing to some extent during operation to compensate for any misalignments which may exist in the apparatus.

Broadly, the present invention contemplates magnetic recording apparatus in which the recording surface is in the form of a pliable disk which is rotated to cooperate with one or more transducers positioned adjacent the disk surface. The general concept of the use of a pliable disk surface as a recording medium is known in the art, but none of the devices proposed for recording with this technique have operated satisfactorily, owing to a number of technical difficulties involved. One of the primary difficulties involves stabilizing a pliable rotating disk so that it maintains the desred spatial relationship with the transducer or transducers at all times. A disk which has sufficient pliability to be useful as a pliable recording surface is often subject to various mechanical disturbances while rotating, such as vibrations and/or standing waves, which distort the shape of the disk if it is rotating in an essentially unsupported fashion. Such distortions of the shape of the rotating disk render the disk of little or no value as a recording medium since it is impossible to accurately maintain the recording surface in contact with or closely adjacent the transducers.

In accordance with the present invention, a rotating pliable disk cooperates with transducer means which, either by themselves or in conjunction with other elements, provide a loading pressure to maintain the disk in the desired relationship to the transducers at all times. In the simplest form, this loading force is provided by the transducer mounting mechanism itself which may be in the form of a pair of mounting bars positioned on opposite sides of the rotating disk and so contoured as to provide a loading force which tends to maintain the position of the disk stable with respect to the transducers.

The principles described below in connection with air will also apply to a pliable disk rotating in any other viscous fluid, gas or liquid. In this and other forms of the invention, the thickness of the transducer mounting bar may be tapered in the direction of the disk rotation so as to form a wedge of air between the disk surfaces and the mounting bars at the trailing edge of these bars. By taper is meant any head bar shape which, in conjunction with the moving surface of the pliable disk, results in a narrowing or constriction of the path for the boundary layer of air carried by the disk. These air wedges, which are the result of a viscous induced compression of the boundary layer of air carried by the disk itself, serve to provide an air bearing which maintains the disk at a fixed distance from each of the opposed transducer mounting arms under all conditions of rotation above a certain minimum speed so that the transducer may accurately cooperate with the rotating record surface.

It is therefore an object of the present invention to provide improved apparatus for magnetic recording.

It is a further object of the present invention to provide improved apparatus for magnetic recording utilizing a resilient disk member as a recording surface.

It is an additional object of the present invention to provide apparatus for magnetic recording in which the recording surface is in the form of a pliable disk which is controlled by the introduction of one or more loading forces disposed along the path of rotation so as to cause the disk to have a controllable position relative to a transducer mechanism.

The foregoing and other objects, features and advantages of the invention will be apparent from the following more particular description of preferred embodiments of the invention, as illustrated in the accompanying drawings.

Figure 3:
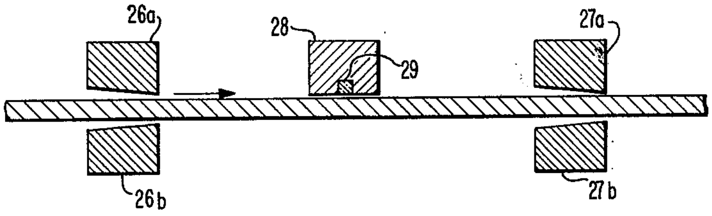
Figure 4:
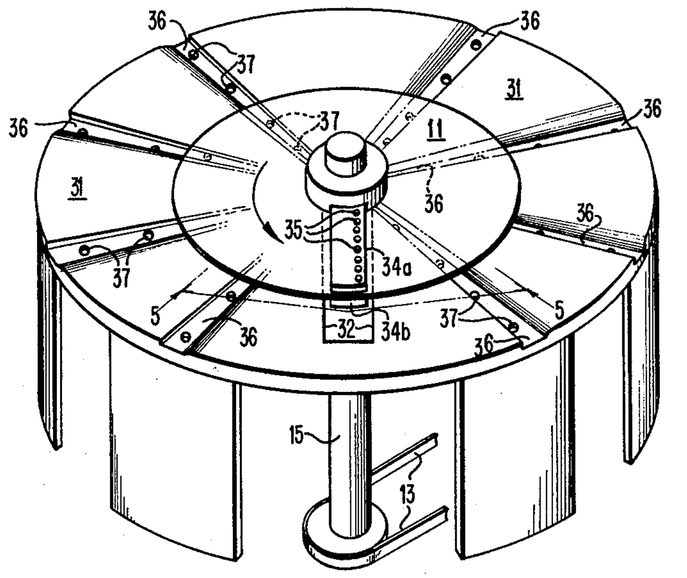
Figure 5:
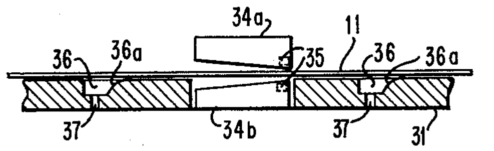

FIG. 3 diagrammatically illustrates an additional embodiment of the present invention in which the rotating disk is air loaded and therefore positioned by two pair of opposed loading members disposed on opposite sides of the transducer head;

FIG. 4 is a perspective view illustrating an additional embodiment of the present invention in which the control of the pliable disk is achieved by the use of a rigid guide disk disposed adjacent the pliable disk;

FIG. 5 is a sectional view of a portion of the apparatus of FIG. 4, showing the configuration of the air grooves in the guide disk and the shape of the transducer head.

Figure 6:
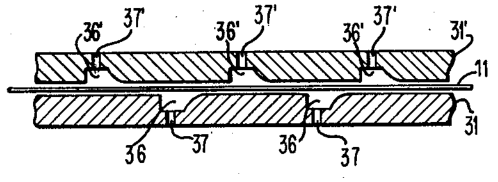
Figure 7:
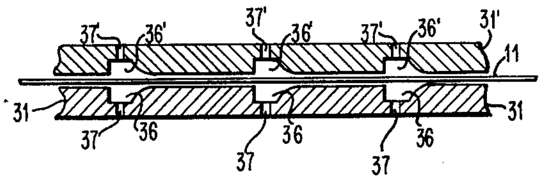
Figure 8A:
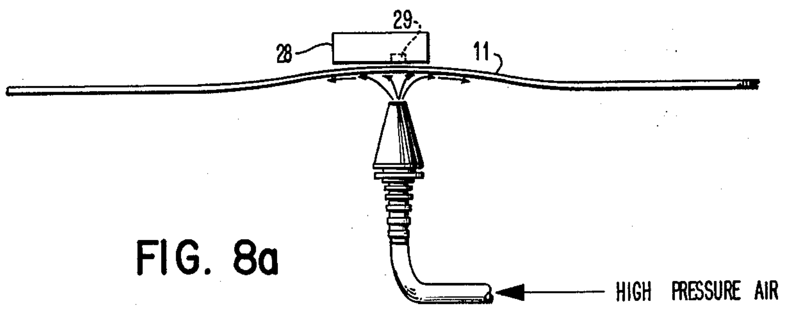
Figure 8B:
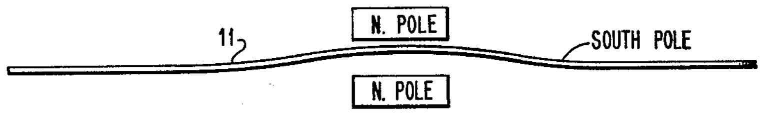
Figure 8C:

FIGS. 6 and 7 are sectional views of alternative arrangements of the guide disk shown in FIG. 4; and FIGS. 8*a*, 8*b* and 8*c* diagrammatically illustrate alternative methods of loading a rotating disk member.

Figure 1:
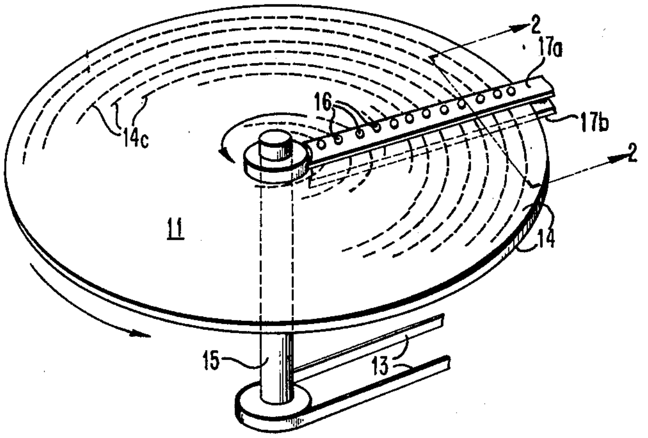
FIG. 1 is a perspective view showing a rotating pliable disk together with a pair of transducer mounting arms disposed on opposite sides of the disk surface so as to provide loading force between the mounting arms to maintain the disk in position relative to the transducers.

Referring to FIG. 1 by character of reference, numeral 11 designates a compliable disk which forms the recording structure in accordance with the present invention. Disk 11 may be of any suitable material, such as metal, plastic, fiberglass or paper. The material should have sufficient strength to retain its general circular shape while under the influence of the forces acting upon it during rotation, and should have sufficient pliability to flex while rotating so as to position the recording surface closely adjacent its associated transducers. Disk 11 may be driven by any suitable means, such as through a shaft 15 from a belt 13. Disk 11 is provided on at least one surface with a magnetizable material which forms a magnetic recording medium. Preferably, disk 11 is provided with magnetizable layers 14*a*, 14*b* on each of its opposed surfaces and these layers are each provided with a plurality of concentric recording tracks 14*c* on which the different magnetic bits may be recorded.

Figure 2:
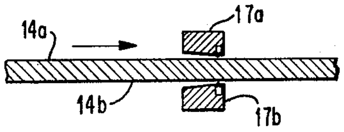
FIG. 2 is a view of the transducer mounting arms of FIG. 1 and a portion of the disk illustrating the contouring of the transducer arms to provide the air loading of the disk.

To cooperate with the different recording tracks on each side of disk 11, there are provided a plurality of transducers 16 which are mounted on a pair of transducer head bars 17*a* and 17*b*. As shown in FIG. 1, the transducers 16 are spaced radially of disk 11 so that each transducer may cooperate with an associated recording track on the disk. As best shown in FIG. 2, transducer head bars 17*a* and 17*b* are disposed on opposite sides of the disk 11 and their surfaces facing disk 11 are provided with a taper toward the disk in the direction of the disk rotation. This taper results in a reduction in the space between head bars 17 and disk 11 from the front to the back of the head bars so that a wedge of air is produced, this wedge being narrowest at the trailing edges of the head bars. This wedge of air produces a pressure on either side of disk 11 which tends to maintain the disk at a uniform spacing from each of the head bars.

The transducers 16 are preferably disposed in head bars 17 close to the trailing edges thereof so as to magnetically cooperate with the magnetizable surface of the disk when these surfaces are closest to the head bars and at a uniform spacing therefrom. The gap between the transducers and the magnetizable layers is a minimum when the transducers are disposed on this portion of the head bars. As disk 11 rotates, its pliability will enable it to flex sufficiently in the space between head bars 17 so as to always position the two recording surfaces at a substantially constant spacing from the transducers. Thus, even when the head bars 17 and/or the disk drive are slightly out of alignment, the pliability of the recording medium will enable it to position itself properly with respect to the transducers between the head bars 17.

FIG. 3 illustrates an alternative embodiment of the invention in which the rotating pliable disk is loaded by means of two pair of air bearing members 26*a*, 26*b* and 27*a*, 27*b*. Air bearing members 26 and 27 are disposed on opposite sides of disk 11, while a transducer head bar 28 with a transducer 29 mounted thereon is disposed between the air bearing members. Each pair of air bearing members is provided with a taper on their opposed surfaces converging toward the disk in the direction of disk travel so as to form an air wedge in a manner similar to that described above in connection with the embodiment of FIG. 1. This air wedge results in stabilization of the position of the disk relative to the air bearing members such that it maintains the disk at a constant spacing from the air bearing head members at all rotational velocities above a certain minimum value. With the disc thus stabilized in position at air bearing members 26 and 27, its position relative to transducer head bar 28 and transducer 29 is also relatively fixed so that the disk is always positioned closely adjacent to or in contact with the transducer 29 to produce maximum effectiveness in recording and/or reproducing. In this case, head bar 28 needs not contribute to air bearing control and this bar 28 may be made in a minimum weight structure simply to hold the heads. Due to minimum weight, bar 28 can now be accessed more quickly and easily.

FIG. 4 is a perspective view of an additional alternative embodiment of the present invention utilizing a guide disk to provide additional stability for the pliable disk. In pliable disks rotating at high speeds it is possible that the generation of standing waves or other types of mechanical motion may distort the shape of the disk and render it unsuitable for use as a recording medium. To prevent this distortion of the disk, there is shown in FIG. 4 a guide disk in the form of a plate 31 which is placed under the pliable disk 11 so as to provide a support to prevent any appreciable amount of transverse motion of the pliable disk while rotating. As shown, guide disk 31 is provided with an opening in the center thereof through which drive shaft 15 extends for driving disk 11. Guide disk 31 is also provided with an opening 32 to permit the insertion of a pair of transducer mounting bars 34*a*, 34*b* on opposite sides of disk 11. Transducer mounting bars 34 are provided with a plurality of transducers 35 mounted therein for cooperating with the recording surfaces on opposite sides of the disk.

While it is possible to operate disk 11 in conjunction with a solid guide disk underneath, it has been found in some instances that the pliable disk, in rotating relative to the guide disk, acts as a centrifugal pump to expel air from between the rotating disk and the guide disk. This expulsion of air produces a suction in the space between the disks which tends to draw the rotating disk toward the fixed guide disk and clamp it thereto, thus producing damage or complete destruction of the rotating disk. To prevent this expulsion of air from beneath the surface of the rotating pliable disk, there are preferably provided a plurality of grooves 36 extending radially of guide disk 31 and passing underneath the rotating disk 11. As best shown in the sectional view of FIG. 5, each of these grooves is also preferably provided with channels 37 which extend through guide disk 31 so as to be open to the ambient air underneath the guide disk and thus insure a supply of ambient air to grooves 36 and the underside of the pliable disk 11. Grooves 36 are also preferably provided, as shown in FIG. 5, with a bevelled portion 36*a* on their trailing edges so as to help in forming an air wedge between the rotating disk member and the bevelled edge. This action stabilizes the position of the disk relative to the guide disk similar to that described above in connection with the embodiments of FIGS. 1 and 3, to insure that the rotating disk maintains its position relative to the guide disk and to the transducer head bars 34.

The apparatus of FIG. 4 should provide increased stability for the rotating pliable disk member 11, since guide disk 31 serves to form a general guide for the rotating disk, while the air wedges formed in grooves 36 serve to maintain the rotating disk at a constant spacing from the guide disk and the transducers. It will be obvious that the numerous variations of the structure shown in FIG. 4 may be utilized. One such configuration is illustrated in the cross sectional view of FIG. 6 in which the openings 36 in a pair of opposed guide disk members 31 are staggered with respect to each other. As shown in FIG. 6, two guide disk members 31, 31' are disposed on opposite sides of the recording disk 11 and the openings 36, 36' are offset with respect to each other around the circumference of the disk so as to produce a staggering of the air grooves around the circumference. As an alternative to the embodiment of FIG. 6, apparatus such as shown in FIG. 7 may be utilized in which the opposite guide disk members 31, 31' are provided with mating openings 36, 36' which are aligned with each other around the circumference of the guide disks.

In the use of air bearing heads in conjunction with flexible surfaces, the exact shape of the air bearing is much less critical to performance than in the case of air bearings (such as gliding heads) operating in conjunction with rigid surfaces such as "hard" disks or drums. This is because the flexible surface can assume a curvature of its own when operating in conjunction with the air bearing. Fortunately, in many instances this phenomenon results in a nearly optimum wedge effect on the viscous boundary layer of air provided, even if the head bar shape has not been given the theoretically optimum shape (providing that a proper means of loading the flexible surface against the air bearing has been chosen). Thus, the choice of loading force becomes one of the most important considerations. The preferred loading force is the configuration of opposed mating head bars as shown and described in FIGS. 1–7. However, other means of loading, such as the use of air jets as shown in FIG. 8*a*, the use of magnetic force as shown in FIG. 8*b* and the use of electrostatic force as shown in FIG. 8*c*, may also be utilized with effectiveness.

Although the above description relates to magnetic recording disks, the present invention may be utilized in other applications, such as electrostatic recording, photographic disks, or any situation in which it is desirable to use a thin, flexible disk with the requirement that the disk position be very closely controlled as it passes a station where some function is performed. (The implied advantage is also that no physical contact occurs.) The reference to thin, flexible disks includes disks of considerable thickness which are nevertheless to a minor degree flexible. This is because sufficient forces can be developed by the air bearing to flex disks which are ordinarily considered quite rigid.

While the invention has been particularly shown and described with reference to preferred embodiments thereof, it will be understood by those skilled in the art that various additional changes may be made therein without departing from the spirit and scope of the invention.

What is claimed is:

1. Recording apparatus comprising a compliable rotating disk having a recording medium on at least one surface thereof,
   a rigid guide disk member disposed closely adjacent said compliable disk to limit the transverse movement of said compliable disk,
   said guide disk member having an opening therein,
   a pair of loading members extending into said opening and disposed adjacent opposite surfaces of said rotating disk for producing a wedge of air between said disk surfaces and each of said loading members to control the position of said disk relative to said loading members,
   the spacing between said loading members and said rotating disk decreasing in the direction of rotation of said rotating disk, and
   transducer means in at least one of said loading members for cooperating with said rotating disk.

2. Apparatus in accordance with claim 1 in which said transducers are disposed in the portions of said loading members closest to said rotating disk.

3. Recording apparatus comprising a compliable rotating disk having a recording medium on at least one surface thereof, a pair of loading members disposed adjacent the opposite surfaces of said disk, the space between each of said loading members and said disk decreasing in the direction of rotation of said disk to produce a wedge of air between said disk and said loading means, and transducer means positioned to cooperate with said deflected disk to record on said recording medium.

4. Apparatus in accordance with claim 3 in which said transducer means is disposed in said loading member.

5. Apparatus in accordance with claim 3 in which said transducer means is disposed in said loading members in the portions thereof closest to said disk.

6. Recording apparatus comprising a compliable rotating disk having a recording medium on at least one surface thereof, a rigid guide disk member disposed closely adjacent said compliable disk to limit the transverse movement of said compliable disk, said guide disk member having an opening, a pair of loading members extending into said opening and disposed adjacent opposite surfaces of said rotating disk for producing a wedge of air between said disk surfaces and each of said loading members to control the position of said disk relative to said loading members, transducer means in at least one of said loading members for cooperating with said rotating disk, and a plurality of channels in said guide disk underlying said rotating disk to supply air to the space between said rotating disk and said guide disk.

7. Recording apparatus comprising a compliable rotating disk having a recording medium on at least one surface thereof, a pair of rigid guide disk members disposed closely adjacent the opposite surfaces of said compliable disk to limit the transverse movement of said compliable disk, said guide disk member having an opening, a pair of loading members extending into said opening and disposed adjacent opposite surfaces of said rotating disk for producing a wedge of air between said disk surfaces and each of said loading members to control the position of said disk relative to said loading members, transducer means in at least one of said loading members for cooperating with said rotating disk, and a plurality of channels in said guide disks underlying said rotating disk to supply air to the space between said rotating disk and said guide disks.

8. Apparatus in accordance with claim 7 in which the spacing between said loading members and said rotating disk decreases in the direction of rotation of said rotating disk.

9. Apparatus in accordance with claim 8 in which said transducers are disposed in the portion of said loading members closest to said rotating disk.

References Cited in the file of this patent

UNITED STATES PATENTS

| | | |
|---|---|---|
| 2,883,475 | Ridler et al. | Apr. 21, 1959 |
| 2,899,260 | Farrand et al. | Aug. 11, 1959 |

FOREIGN PATENTS

| | | |
|---|---|---|
| 1,119,186 | France | June 15, 1956 |
| 850,766 | Great Britain | Oct. 5, 1960 |